United States Patent
Field et al.

[15] 3,687,967
[45] Aug. 29, 1972

[54] α-DEHYDROBIOTIN SYNTHESIS

[72] Inventors: George Francis Field, West Caldwell; Leo H. Sternbach, Upper Montclair; William Joseph Zally, Cresskill, all of N.Y.

[73] Assignee: Hoffman-La Roche Inc., Nutley, N.J.

[22] Filed: Feb. 24, 1969

[21] Appl. No.: 801,770

[52] U.S. Cl..............260/309.7, 424/273, 260/240 J
[51] Int. Cl. ..........................................C07d 49/36
[58] Field of Search...................................260/309.7

[56] References Cited

UNITED STATES PATENTS

| | | |
|---|---|---|
| 3,533,915 | 10/1970 | Hanka et al. ............260/309.7 |
| 2,417,326 | 3/1947 | Schnider et al..........260/309.7 |
| 2,466,004 | 4/1949 | Cheney et al...........260/309.7 |
| 2,489,237 | 11/1949 | Goldberg et al........260/309.7 |

OTHER PUBLICATIONS

Hanka et al., "Science" Vol. 154 (3757), pages 1667–1668 (1966).
Isaka et al., Yakugaku Zasshi (1968), Vol. 88, No. 8, pages 1068–1073.
Noller, "Chemistry of Organic Compounds" 2nd Ed., page 170 (Saunders) (1957).

Primary Examiner—Henry R. Jiles
Assistant Examiner—Robert T. Bond
Attorney—Samuel L. Welt, Jon S. Saxe, Bernard S. Leon, William H. Epstein and George M. Gould

[57] ABSTRACT

A process of producing α-dehydrobiotin from a 3,4-(2'-ketoimidazolido)-1,2-trimethylenethiophanium salt.

34 Claims, No Drawings

α-DEHYDROBIOTIN SYNTHESIS

BACKGROUND OF THE INVENTION

α-Dehydrobiotin which is a compound of the formula:

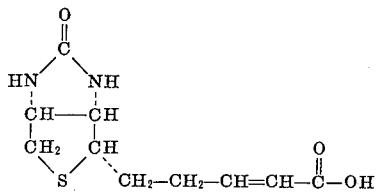

I is a known antibiotic useful against gram-positive and gram-negative bacteria and fungi. In the past, α-dehydrobiotin has been prepared by isolation from *Streptomyces hydicus*. The process of isolating α-dehydrobiotin from its natural sources suffers from inherent disadvantages such as contamination with other natural materials and cost of production. As of now, there has been no direct method for chemically synthesizing α-dehydrobiotin.

SUMMARY OF THE INVENTION

In accordance with this invention, it has been discovered that the optical isomer of formula I and racemates thereof can be synthesized directly from a salt of the formula:

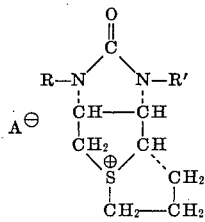

II wherein A is an anion, and R and R' are selected from the group consisting of aryl lower alkyl.

In accordance with the process of this invention, one can produce the natural α-dehydrobiotin as well as its racemate. The natural α-dehydrobiotin as well as its racemate has antibiotic activity against gram-positive and gram-negative bacteria.

DETAILED DESCRIPTION OF THE INVENTION

In the structural formulas given through the application, the substituents which are attached to the molecule above the plane of the molecule are designated by Δ and the substituents which are attached to the molecule below the plane of the molecule are designated by —.

The term "halogen" utilized throughout the specification includes all four halogens, i.e., fluorine, bromine, chlorine, and iodine with chlorine and bromine being preferred. The term "lower alkyl" includes both branched and straight chain alkyl groups containing from one to seven carbon atoms such as methyl, ethyl, isopropyl, etc. The term "lower alkoxy" as used throughout the specification includes lower alkoxy groups containing from one to seven carbon atoms such as methoxy, ethoxy, isopropoxy, etc. The term "lower alkanoyl" as used throughout the specification cation includes lower alkanoyl groups containing from one to seven carbon atoms such as formyl, acetyl, propionyl, butyryl and the like.

The term "aryl" as used throughout the application includes mono-nuclear aryl groups such as phenyl which can be unsubstituted or substituted in one or more positions with a lower alkyl, halogen, lower alkoxy, amino, nitro, mono and di-substituted lower alkyl amino, etc., or polynuclear aryl groups such as naphthyl, anthryl, phenanthryl, azulyl, etc. which may be unsubstituted or substituted with one or more of the aforementioned groups.

The term "aryl lower alkyl" comprehends aryl lower alkyl groups wherein the aryl moiety and the lower alkyl moiety are defined as above. Among the preferred aryl lower alkyl groups which can form R and R' are included aryl lower alkyl radicals wherein the aryl group is unsubstituted such as benzyl, phenylethyl, etc. and lower alkyl or lower alkoxy substituted aryl lower alkyl radicals such as o-methyl-benzyl, p-ethyl-benzyl, p-ethoxy-benzyl, 2,4-dimethoxy benzyl, etc.

In accordance with this invention, A can be any conventional anion. In accordance with a preferred embodiment of this invention, A is a halogen ion or the anion of a sulfonic acid such as paratoluene sulfonic acid or a sulfonic acid resolving agent such as d-camphorsulfonic acid.

In accordance with this invention, the compound of the formula II is converted to a compound of the formula I via the intermediate of the formula:

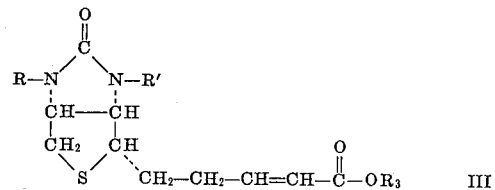

III wherein R and R' are as above, and $R_3$ is lower alkyl or aryl lower alkyl or racemates thereof. The compound of formula II above or its racemate is converted to the intermediate of the formula III above or its racemate via the following reaction scheme:

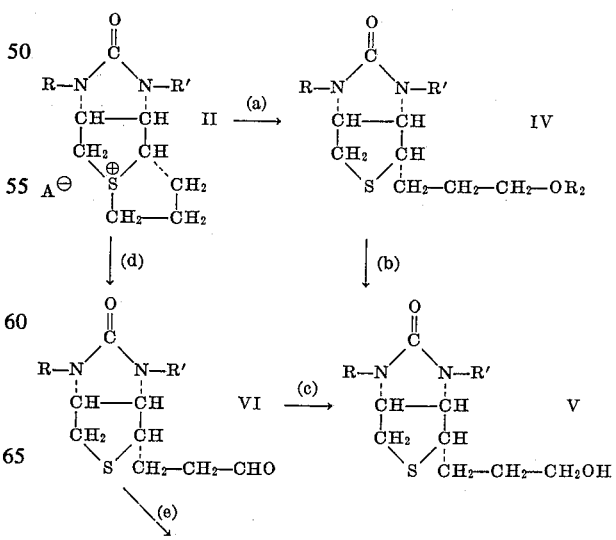

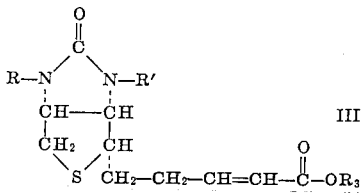

III wherein R, R' and A are as above; $R_2$ is selected from the group consisting of lower alkanoyl and aryl lower alkanoyl and $R_3$ is lower alkyl or aryl lower alkyl.

The above reaction scheme includes the optical isomer designated by the formula as well as racemates thereof.

In the first step of the synthesis of this invention, the compounds of the formula II above are converted to compounds of the formula IV above via reaction step (a). The reaction of step (a) is carried out by treating the compound of the formula II above with an alkali metal salt of a lower alkanoic acid or an alkali metal salt of an aryl lower alkanoic acid. Any conventional lower alkanoic acid such as acetic acid, formic acid, etc., and any conventional alkali metal salt of an aryl lower alkanoic acid such as benzoic acid can be utilized in carrying out this reaction. The reaction of step (a) can be carried out in the presence of an inert solvent. Any conventional inert solvent can be utilized for carrying out the reaction of step (a). Among the conventional solvents which can be utilized in carrying out the reaction of step (a), water or a lower alkanol such as methanol and ethanol are preferred. If desired, the reaction of step (a) can be carried out in a solvent mixture such as a mixture consisting of water and a lower alkanol such as methanol or ethanol. In carrying out this reaction, temperature and pressure are not critical and this reaction can be carried out at room temperature and atmospheric pressure. If desired, elevated temperatures and pressures can be utilized. Generally, the reaction of step (a) is carried out at the reflux temperature of the solvent medium. However, temperatures from about 0° C. to the reflux temperature of the solvent medium can also be utilized.

The ester of formula IV above can be converted to the hydroxy compound of formula V above by ester hydrolysis. Any conventional method of ester hydrolysis can be utilized to carry out the conversion of compounds of the formula IV above to compounds of the formula V above. Generally, it is preferred to utilize an alkali metal hydroxide as the ester hydrolyzing agent in the reaction of step (b). Among the alkali metal hydroxides, sodium hydroxide is preferred. The ester hydrolysis can be carried out in an inert solvent medium. Any conventional inert solvent can be utilized. Among the preferred solvents are included water and lower alkanols, such as methanol or ethanol. Generally, it is preferred to utilize a solvent mixture consisting of water and a lower alkanol. In carrying out this reaction, temperature and pressure are not critical and this reaction can be carried out at room temperature and atmospheric pressure, as well as elevated temperatures and pressures. Generally, the temperatures of from about 20° C. to 100° C. are utilized, depending upon the reflux temperature of the solvent medium. In carrying out the reaction of step (b), it is generally preferred to utilize the reflux temperature of the reaction medium.

The compound of formula V is converted to the compound of formula VI via reaction step (c) by oxidizing the compound of the formula V in the presence of a strong dehydrating agent utilizing an acid catalyst selected from the group consisting of phosphoric acid and pyridine trihalo acetate. A preferred method for carrying out this oxidation reaction is by the treatment of a compound of the formula VI above with a diloweralkyl-sulfoxide oxidizing agent such as dimethyl sulfoxide. Among the acid catalyst designated above, pyridine trifluoro acetate and orthophosphoric acid are preferred. Among the conventional strong dehydrating agents, the dilower alkyl or dicycloalkyl carbodiimide wherein cycloalkyl group contains from three to seven carbon atoms such as dicyclohexylcarbodiimide are preferred. This reaction can be carried out without utilizing an inert organic solvent since an excess of the oxidizing agent such as a dilower alkyl sulfoxide can be utilized as the reaction medium. However, if desired, an inert organic solvent can be present. Any conventional inert organic solvent such as tetrahydrofuran, benzene, xylene, etc., can be utilized, if so desired. In carrying out this reaction, temperature and pressure are not critical and this reaction can be carried out at room temperature and atmospheric pressure. On the other hand, elevated and reduced temperature can be utilized. Generally, this reaction is carried out at temperatures of from −40° C. to 70° C.

In accordance with another embodiment of this invention, the compound of formula II above can be converted to the compound of formula VI above via reaction step (d). Reaction step (d) is carried out by treating the compound of formula II above with an alkali metal salt of a secondary nitro lower alkane containing from three to seven carbon atoms. Any conventional alkali metal salt of a secondary nitro lower alkane containing from three to seven carbon atoms such as the sodium salt of 2-nitro-propane, can be utilized in carrying out the process of step (d). The reaction of step (d) can be carried out in a solvent medium. Any conventional solvent medium such as water or inert organic solvents can be utilized in carrying out this reaction. Among the preferred inert organic solvents which can be utilized to carry out the reaction of step (d), the lower alkanols such as ethanol are preferred, In carrying out this reaction, aqueous ethanol is the preferred solvent medium. In carrying out this reaction, temperature and pressure are not critical, and this reaction can be carried out at room temperature and atmospheric pressure. If desired, elevated temperatures and pressures can be utilized. Generally, this reaction is carried out at a temperature of from about 20° C. to 100° C., depending upon the reflux temperature of the solvent medium. It is preferred to carry out this reaction at the reflux temperature of the solvent medium.

The compound of formula VI above can be converted to the compound of formula III above by any of two methods. In the first method, the compound of formula VI above is reacted with a compound of the formula:

VII wherein $R_3$ is as above, and $R_4$ is lower alkyl, aryl or aryl lower alkyl, in an inert organic solvent medium in the presence of a base. Furthermore, this reaction is carried out under substantially anhydrous conditions. Any conventional inert organic solvent can be utilized as the organic solvent medium. Among the conventional organic solvents that can be utilized are included ethyl ether, tetrahydrofuran, methanol, ethanol, isopropanol, etc. Among the conventional bases which can be utilized are included the alkali metal hydrides such as potassium hydride, sodium hydride and lithium hydride; alkali metal hydroxides such as sodium hydroxide, potassium hydroxide and lithium hydroxide; alkali metal amides such as sodium amide, potassium amide, etc.; organic alkali such as sodium methoxide, potassium t-butoxide, etc. In carrying out this reaction, it is preferred to react 1 mole of the compound of formula VI above with 1 mole of the compound of the formula VII above. However, if desired, a molar excess of the compound of formula VI above or a molar excess of the compound of formula VII above can be utilized in this reaction. In carrying out this reaction, temperature and pressure are not critical, and this reaction can be effected at room temperature and atmospheric pressure or at elevated temperatures such as the reflux temperature of the solvent or at reduced temperatures such as slightly above the freezing temperature of the solvent.

In accordance with another embodiment of this invention, the compound of formula VI above is converted into the compound of formula III above by reaction with a compound of the formula:

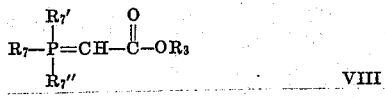

wherein $R_3$ is as above, and $R_7$, $R_7'$ and $R_7''$ are aryl, lower alkyl or aryl lower alkyl.

This reaction can be carried out in an inert organic solvent medium. Any conventional inert organic solvent medium such as methanol, tetrahydrofuran, pyridine, isopropyl ether and ethyl ether, can be utilized. In carrying out this reaction, temperature and pressure are not critical, although operating conditions of from about 10° C. to about 40° C. are generally preferred.

The compound of formula III above can be converted to the compound of formula I above by the following reaction scheme:

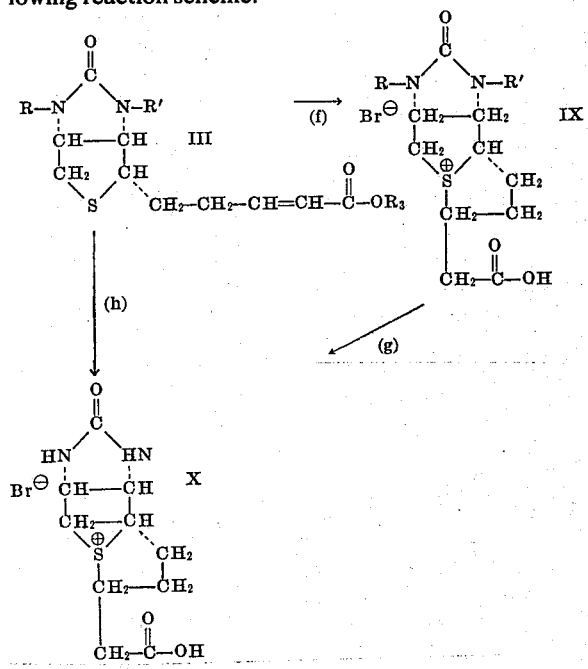

wherein R and R' are as above and $R_3$ and $R_8$ are lower alkyl or aryl lower alkyl.

In accordance with this invention, the compound of formula III above is converted to the compound of formula IX above via reaction step (f). The reaction of step (f) is carried out by refluxing the compound of formula III above with concentrated aqueous hydrogen bromide. This reaction should be carried out at the reflux temperature for a period of at least 15 minutes. If desired, refluxing can be carried out for a period of about 1 hour. On the other hand, the compound of formula IX need not be isolated but can be further refluxed with concentrated saturated aqueous hydrogen bromide. In this manner, the compound of formula IX is converted into the compound of formula X via reaction step (g). This is carried out by refluxing the compound of the formula IX with concentrated aqueous hydrogen bromide for a period of at least 1 hour, preferably from 2 to 7 hours. On the other hand, the compound of formula III can be directly converted to the compound of formula X, via reaction step (h) by refluxing the compound of the formula III above with concentrated aqueous hydrogen bromide, for a period of at least 2.5 hours, preferably from a period of from 4 hours to about 10 hours. In reaction steps (f), (g) and (h), the concentrated aqueous hydrogen bromide is an aqueous solution containing 48 percent by weight of hydrogen bromide. While an aqueous solution containing 48 percent by weight of hydrogen bromide is preferred, the reaction of steps (f), (g) and (h) can take place with aqueous solutions containing from 20 to 48 percent by weight of hydrogen bromide.

In converting the compound of the formula X to the compound of the formula XI, via reaction step (i), the compound of formula X is first esterified and then subjected to ring cleavage. The acid group of the compound of formula X is first esterified with either a lower alkanol or aryl lower alkanol. Any conventional means of esterification can be utilized to esterify the compound of formula X. A preferred method of esterification is carried out by treating the compound of formula X above with a lower alkanol or aryl lower alkanol in the presence of an acid catalyst. Any conventional acid catalyst can be utilized. Among the conventional acid catalysts which can be utilized are included the hydrohalic acids such as hydrogen bromide, hydrogen chloride, etc.; mineral acids such as sulfuric acids, organic acids such as toluene sulfonic acid; Lewis acids such as boron trifluoride and aluminum trichloride, etc. The esterification reaction can be carried out in an inert organic solvent. Any conventional inert organic

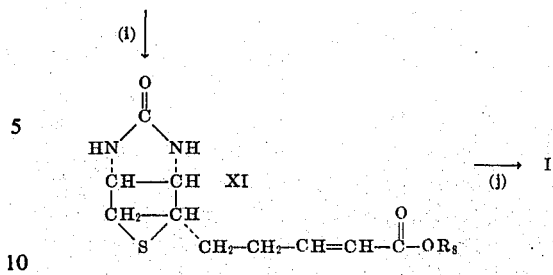

solvent such as the solvents hereinbefore mentioned can be utilized. Alternatively, the esterification reaction can be carried out in the alkanol or aryl alkanol utilized to esterify the compound of formula X above. In carrying out this reaction, temperature and pressure are not critical and this reaction can be carried out at room temperature and atmospheric pressure. If desired, elevated temperatures and pressures can be utilized. This reaction can be advantageously carried out at a temperature of from about 20° C. to 100° C., depending upon the reflux temperature of the reaction medium.

In the second stage of step (i) the esterified compound of formula X is converted to the compound of formula XI. This is accomplished by treating the compound of formula XI with a weak base. Any conventional weak base can be utilized for carrying out this reaction. Among the weak bases which can be utilized for carrying out this reaction are included the alkali metal carbonates such as sodium bicarbonate; the alkali metal phosphates, such as disodium phosphate; organic amine bases such as pyridine, triethyl amine, etc. This reaction can be carried out in water or an inert organic solvent. Any conventional inert organic solvent such as the solvents hereinbefore mentioned can be utilized in carrying out this reaction. This reaction is carried out at a temperature of from about 0° to 40° C. with room temperature being preferred.

In order to convert the compound of formula XI to the compound of formula I above, the compound of formula XI is subjected to alkaline hydrolysis via reaction step (j). Any conventional method of alkaline hydrolysis can be utilized to convert the compound of formula XI to the compound of formula I. Among the conventional methods for hydrolysis which can be utilized in carrying out the reaction of step (j), it is preferred to utilize an alkali metal hydrolyzing agent. Any conventional alkali metal hydrolyzing agent can be utilized to convert the compound of formula XI above into the compound of formula I. Among the conventional alkali metal hydrolyzing agents which can be utilized are included sodium hydroxide, potassium hydroxide, etc. Generally, this reaction can be carried out in the presence of a solvent such as water or an inert organic solvent. Any conventional inert organic solvent such as the solvents hereinbefore mentioned can be utilized in carrying out this reaction. Generally, it is preferred to carry out this reaction in an aqueous medium.

In carrying out the reaction of step (j) temperature and pressure are not critical, and this reaction can be carried out at room temperature and atmospheric pressure. If desired, elevated or reduced temperatures can be utilized. Generally, it is preferred to carry out this reaction at the reflux temperature of the reaction medium.

If it is desired to produce the natural α-dehydrobiotin (compound of formula I), one utilizes a salt of the formula II as a starting material and treats it in the foregoing manner.

On the other hand, if it is desired to produce the racemate of the compound of formula I, one utilized the racemate of the compound of formula II as the starting material.

The invention will be more fully understood from the specific examples which follow. These examples are intended to illustrate the invention, and are not to be construed as limitative thereof. The temperatures utilized in these examples are in degrees Centigrade and the ether utilized is diethyl ether.

EXAMPLE 1

A solution of 47.6 g. (80 mmole) of 1-3,4- (1',3'-dibenzyl-2'-ketoimidazolido)-1,2-trimethylene-thiophanium d-camphorsulfonate and 16 g. (200 mmole) of anhydrous sodium acetate in 1 liter of ethanol was stirred and heated under reflux for 2.5 hour, and then cooled and concentrated in vacuo. The residue was diluted with 1 liter of water to give 1-1,3-dibenzyl-2-oxohexahydrothieno[3,4-d]imidazole-4β-propanolacetate, m. p. 95°–98°.

EXAMPLE 2

A solution of 25.4 g. (60 mmoles) of 1-1,3-dibenzyl-2-oxohexahydrothieno[3,4-d]imidazole-4β-propanolacetate in 500 ml. of ethanol and 60 ml. of 1N sodium hydroxide was heated under reflux for 3 hours and allowed to stand overnight at room temperature. After the solution had been diluted with water and brine, it was extracted with methylene chloride in three portions. The residue obtained after the methylene chloride extracts had been dried over sodium sulfate and concentrated in vacuo was crystallized from methylene chloride/petroleum ether solvent mixture to give 1-1,3-dibenzyl-2-oxohexahydrothieno[3,4-d] imidazole-4β-propanol, m. p. 75°–77°.

EXAMPLE 3

To 210 ml. of dry dimethylsulfoxide was added in the following order 73.5 g. (0.192 mole) of 1-1,3-dibenzyl-2-oxohexahydrothieno[3,4-d]imidazole-4-propanol, 117.9 g. (0.572 mole) of N,N'-dicyclohexylcarbodiimide, 15 ml. of pyridine and 11.2 ml. of trifluoroacetic acid. The temperature of the stirred solution was held below 32° with an ice bath. The reaction mixture was stirred overnight at room temperature after the initial exothermic reaction had subsided. After dilution with water and ether the excess carbodiimide was decomposed by addition of 75 g. of oxalic acid in 150 ml. of methanol. After the mixture had been stirred for 1 hour, it was filtered, and the ether layer separated, dried over sodium sulfate and concentrated in vacuo. The residue was dissolved in methylene chloride and filtered through silica gel. Concentration of the eluates left 66.1 g. of an oil which could not be induced to crystallize. This oil was dissolved in ether and filtered through alumina. The oil which was eluted with ether:ethyl acetate (1:1 parts by volume) crystallized from ether/hexane to give the aldehyde product 1-1,3-dibenzyl-2-oxohexahydrothieno[3,4-d]imidazole-4β-propanal.

EXAMPLE 4

A mixture of 7.5 g. (50 percent oil dispersion, 0.15 mole) of sodium hydride, 34 g. (0.15 mole) of triethyl phosphonoacetate and 1.5 liters of dry tetrahydrofuran was stirred for 1 hour at 5°–10°. During 15 minutes a solution of the aldehyde product prepared in Example 3 (ca. 0.14 mole) in 250 ml. of tetrahydrofuran was added while maintaining the temperature at 5°–10°. The reaction mixture was stirred 1 hour at room temperature, diluted with water and extracted with ether twice. The ethereal extracts were dried and concentrated in vacuo. The residual oil was dissolved in methylene chloride and the solution filtered through alumina. The residue left on concentration of the methylene chloride extracts was crystallized from hexane/petroleum ether to give crude 1-1,3-dibenzyl-2-oxohexahydrothieno[3,4-d]imidazole-4-penta-delta-alpha-enoic acid ethyl ester, m. p. 70°–75°. Recrystallization from petroleum ether-hexane gave colorless plates, m. p. 90°–92°.

EXAMPLE 5

A mixture of 2 g. of 1-1,3-dibenzyl-2-oxohexahydrothieno-[3,4-d]-imidazole-4-penta-delta-alpha-enoic acid ethyl ester and 50 ml. of 48 percent by weight aqueous hydrobromic acid was stirred for 1 hour at room temperature. During this time most of the ester dissolves. The solution was then slowly heated to reflux and slow distillation maintained for 1 hour. During this time 10 ml. of hydrobromic acid and 0.8 ml. of immiscible material distilled out. The solution was heated under reflux without distillation for 1 hour, and then the distillate was collected for 0.5 hour to give a further 15 ml. of hydrobromic acid and 1 ml. of immiscible material. The solution was washed with benzene and concentrated in vacuo to 1 g. of residue. This residue was diluted with 1 ml. of 48 percent hydrobromic acid and 100 ml. of anhydrous methanol and the solution stored at room temperature for 2 days. The solution was stirred with excess sodium bicarbonate for 5 hours at 25°, filtered and concentrated in vacuo. The residue was dissolved in methylene chloride. The solution was filtered, washed with saturated sodium bicarbonate, dried and concentrated in vacuo. The residue was crystallized from a 1:1 parts by volume solvent mixture of acetone/ether to give crude methyl ester of d-2-oxohexahydrothieno[3,4-d]imidazole-4-pent-delta-alpha-enoic acid. This ester was warmed on the steam bath for 5 minutes with 1.2 ml. of 1N sodium hydroxide; the solution was filtered and kept at 0.5 hour at room temperature. d-2-oxohexahydrothieno[3,4-d]imidazole-4-pent-delta-alpha-enoic acid was precipitated by addition of 1.7 ml. of 1N hydrochloric acid to give 0.2 g., m.p. 235°–242°. This material was combined with that from three similar reactions and recrystallized from water with addition of chloroform to dissolve any monobenzyl derivative which may be present. Two more recrystallizations from water with charcoal and one from methanol gave white prisms, m.p. 256°–257.5°.

EXAMPLE 6

A mixture of 2.2 g. (5 mmole) of d,1-3,4-(1',3'-dibenzyl-2'-ketoimidazolido)-1,2-trimethylene-thiophanium bromide, 1.0 g. (10 mmole) of sodium acetate, and 150 ml. of ethanol was stirred and heated under reflux for 14 hours. The reaction mixture was diluted with water and extracted with chloroform in four portions. The residue left after the chloroform extracts had been dried and concentrated was crystallized from ethanol/water. Recrystallization from 2-propanol gave d,1-1,3-dibenzyl-2-oxohexahydrothieno[3,4-d]imidazole-4β-propylacetate as white prisms, m.p. 70°–75°.

EXAMPLE 7

A mixture of 4.3 g. (10 mmole) of d,1-1,3-dibenzyl-2-oxohexahydrothieno[3,4-d]imidazole-4β-propylacetate, 10 ml. of 1N sodium hydroxide, and 125 ml. of ethanol was heated under reflux for 1 hour, cooled, diluted with water and extracted with three portions of methylene chloride. Concentration of the methylene chloride extracts gave d,1-1,3-dibenzyl-2-oxohexahydrothieno[3,4-d]imidazole-4β-propanol, m. p. 105°–108°.

EXAMPLE 8

To 10 ml. of dry dimethylsulfoxide were added in this order 3.5 g. of d,1-1,3-dibenzyl-2-oxohexahydrothieno[3,4-d]imidazole-4β-propanol, 5.6 g. of N,N'-dicyclohexylcarbodiimide, 0.7 ml. of pyridine and 0.5 ml. of trifluoracetic acid. This mixture was stirred for 4 hours, and excess carbodiimide was decomposed by addition of 5 g. of oxalic acid in 25 ml. of methanol and some ether. After having been stirred for 1 hour, the mixture was filtered and the precipitate washed with ether. The filtrate was diluted with water and extracted with four portions of ether. The ethereal extracts after drying and concentrating give 3.8 g. of an oil. This oil was dissolved in benzene and adsorbed on 90 g. of silica gel which was then eluted with 250 ml. of benzene, 300 ml. of methylene chloride and 250 ml. of methylene chloride/ethyl acetate (4:1 parts by volume solvent mixture). Crystallization of the residue left on concentration of the ethyl acetate eluate from hexane gave d,1-1,3-dibenzyl-2-oxohexahydrothieno-[3,4-d]imidazole-4β-propionaldehyde, m. p. 95°–106°.

EXAMPLE 9

To a suspension of 0.25 g. (50percent oil dispersion, 5 mmole) of sodium hydride in 30 ml. of dry tetrahydrofuran was added dropwise to a solution of 1.2 g. (5 mmole) of triethylphosphonoacetate in 20 ml. of dry tetrahydrofuran at 10°. The solution was stirred 1 hour at room temperature, and then cooled to 10°. A solution of 1.9 g. (5 mmole) of d,1-1,3-dibenzyl-2-oxohexahydrothieno-[3,4-d]imidazole-4β-propionaldehyde in 25 ml. of tetrahydrofuran was added dropwise at 5°–8°. The reaction mixture was then stirred for 1 hour in the ice bath, diluted water and extracted with three portions of ether. The residue from the dried ether extracts (sodium sulfate) was crystallized from a 1:1 parts by volume mixture of ethyl acetate/ hexane to give d,1-1,3-dibenzyl-2-oxohexahydrothieno[3,4-d]imidazole-4-β-penta-Δ$^\alpha$-enoic acid ethyl ester, m. p. 79°–85.

EXAMPLE 10

A mixture of 2.2 g. (5 mmole) of d,1—1,3-dibenzyl-2-oxohexahydrothieno[3,4-d]imidazole-4-β-penta-Δ$^\alpha$-enoic acid ethyl ester, and 22 ml. of 48percent hydrobromic acid was heated under reflux for 0.5 hour, cooled, washed with benzene and concentrated in vacuo. The residue crystallized from water to give crude d,1-1,3-dibenzyl-2-oxo-6-carboxymethyl-

EXAMPLE 11

A solution of 2.25 g. of d,1-1,3-dibenzyl-2-oxohexahydrothieno[3,4-d]imidazole-4-β-penta-Δα-enoic acid ethyl ester in 10 ml. of benzene was added to 25 ml. of 48percent hydrobromic acid, and most of the benzene distilled out during 15 minutes. Then 25 ml. more hydrobromic acid was added and the mixture heated under reflux for 5 hours. The acid solution was washed with 25 ml. of benzene and concentrated to ca. 5 ml. in vacuo. It was then diluted to 25 ml. with water and charcoaled. Concentration left ca. 2 g. of brown tar. Treatment with a 1:1 parts by volume mixture of methanol/acetone gave d,1-2-oxo-6-carboxymethyl-decahydroimidazo[4,5-c]thieno[1,2-a]thiolium bromide, m. p. 195°-200° (dec.).

EXAMPLE 12

A solution of 2.6 g. of d,1-2-oxo-6-carboxymethyl-decahydroimidazo[4,5-c]thieno[1,2-a]thiolium bromide in 150 ml. of methanol was saturated with hydrogen chloride without cooling and allowed to stand at room temperature for 2 days. Then sodium bicarbonate was added and the solution filtered. The filtrate was concentrated in vacuo to 2.9 g. of residue. This residue was dissolved in 15 ml. of saturated sodium bicarbonate solution. On adjusting the pH to 8 with 3N sodium hydroxide d,1-2-oxohexahydrothieno[3,4-d]imidazole-4β-pent-Δα-enoic methyl ester, m. p. 160°-170° precipitated.

EXAMPLE 13

A solution of 0.3 g. of d,1-2-oxohexahydrothieno[3,4-d]-imidazole-4β-pent-Δα-enoic methyl ester in 3 ml. of boiling methanol was made alkaline to phenolphthalein by addition of 0.1N sodium hydroxide, and heated under reflux for 1 hour. It was then cooled and concentrated in vacuo. The residue was dissolved in hot ethanol; the solution was acidified with 0.1N hydrochloric acid, filtered and cooled to yield d,1-2-oxohexahydrothieno[3,4-d]imidazole-4β-penta-Δα-enoic acid, m.p. 225°-240°.

EXAMPLE 14

A mixture of 3.8 g. (10 mmole) of crude 1-1,3-dibenzyl-2-oxohexahydrothieno[3,4-d]imidazole-4β-propionaldehyde, 3.5 g. (10 mmole) of (carbethoxymethylene) triphenyl phosphorane and 100 ml. of dry tetrahydrofuran was heated under reflux for 2 hours. The mixture was then concentrated in vacuo, and the residue extracted with hot hexane. The hexane extracts were concentrated. The residue was dissolved in methylene chloride and the solution filtered through alumina. The appropriate eluates were concentrated in vacuo and the residue crystallized from petroleum ether/hexane to give 1-1,3-dibenzyl-2-oxohexahydrothieno[3,4-d]imidazole-4-penta-delta-alpha-enioc acid ethyl ester, m.p. 90°-92°.

EXAMPLE 15

To a hot solution of 11.9 g. of 1-3,4-(1',3'-dibenzyl-2'-ketoimidazolido)-1,2-trimethylene-thiophanium d-camphor sulfonate in 100 ml. of ethanol and 10 ml. of water was added a solution of 1.4 g. of potassium hydroxide and 2 ml. of 2-nitropropane in 20 ml. of ethanol. This mixture was heated under reflux for three hours and then concentrated in vacuo until a white solid precipitated. Water and methylene chloride were added. The organic layer was separated, washed with water and dried over sodium sulfate. Concentration in vacuo gave crude 1-1,3-dibenzyl-2-oxo-hexahydrothieno[3,4-d]imidazole-4β-propionaldehyde as a heavy oil.

EXAMPLE 16

A mixture of 2 g. of d,1-1,3-dibenzyl-2-oxo-6-carboxymethyldecahydroimidazo[h4,5-c]thieno[1,2-a]thiolium bromide and 50 ml. of 48percent hydrobromic acid was heated under reflux for 3 hours with slow distillation. The acid solution was cooled, washed with 25 ml. of benzene, concentrated in vacuo to ca. 5 ml., diluted with 25 ml. of water and treated with charcoal. The residue left on concentration in vacuo was crystallized from methanol/acetone to give d,1-2-oxo-6-carboxymethyl decahydroimidazo[4,5-c]thieno[1,2-a]thiolium bromide, m.p. 196°-200° (dec.).

We claim:
1. A compound of the formula:

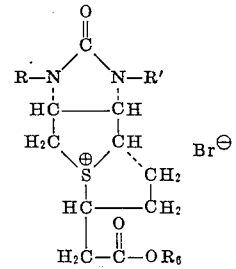

wherein R and R' are hydrogen, phenyl lower alkyl, lower alkyl phenyl lower alkyl or lower alkoxy phenyl lower alkyl and $R_8$ is lower alkyl, phenyl lower alkyl, lower alkyl phenyl lower alkyl, or lower alkoxy phenyl lower alkyl or a racemate thereof.

2. The compound of claim 1, wherein said compound is d,1-2-oxo-6-carboxymethyldecahydroimidazo[4,5-c]thieno[1,2-a]-thiolium bromide.

3. The compound of claim 1, wherein said compound is d,1-1,3-dibenzyl-2-oxo-6-carboxymethyl-decahydroimidazo[4,5-c]-thieno[1,2-a]thiolium bromide.

4. The compound of claim 1 wherein R and R' are benzyl.

5. A compound of the formula:

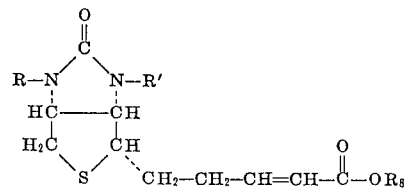

wherein R and R' are selected from the group consisting of phenyl lower alkyl, lower alkyl phenyl lower alkyl and lower alkoxy phenyl lower alkyl and R₈ is lower alkyl, phenyl lower alkyl, lower alkyl phenyl lower alkyl or lower alkoxy phenyl lower alkyl;
or a racemate thereof.

6. The compound of claim 5, wherein said compound is 1-1,3-dibenzyl-2-oxohexahydrothieno[3,4-d]imidazole-4-penta-delta-alpha-enoic acid ethyl ester.

7. The compound of claim 5, wherein said compound is d,1-1,3-dibenzyl-2-oxohexahydrothieno[3,4-d]imidazole-4β-penta-Δª-enoic acid ethyl ester.

8. The compound of claim 5 wherein R and R' are benzyl.

9. A process for producing a compound of the formula:

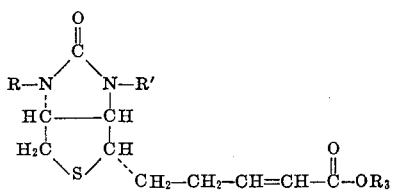

wherein R and R' are phenyl lower alkyl, lower alkyl phenyl lower alkyl or lower alkoxy phenyl lower alkyl and R₃ is lower alkyl, phenyl lower alkyl, lower alkyl phenyl lower alkyl or lower alkoxy phenyl lower alkyl;
or a racemate thereof, comprising treating a compound of the formula:

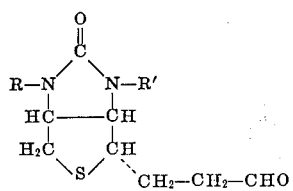

wherein R and R' are as above;
or a racemate thereof, with a phosphorus compound of the formula:

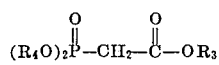

wherein R₃ is as above and R₄ is lower alkyl, phenyl, lower alkyl phenyl, lower alkoxy phenyl, phenyl lower alkyl, lower alkyl phenyl lower alkyl, or lower alkoxy phenyl lower alkyl;
in the presence of a base.

10. A process for producing an acid of the formula:

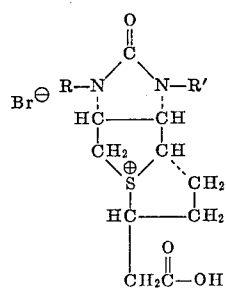

wherein R and R' are phenyl lower alkyl, lower alkyl phenyl lower alkyl or lower alkoxy phenyl lower alkyl;
or a racemate thereof, comprising refluxing a compound of the formula:

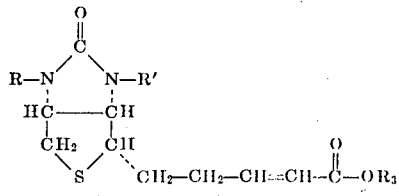

wherein R and R' are as above and R₃ is lower alkyl, phenyl lower alkyl, lower alkyl phenyl lower alkyl, or lower alkoxy phenyl lower alkyl;
or a racemate thereof, with an aqueous solution containing from about 20 percent by weight to about 48 percent by weight of hydrogen bromide for a period of from 15 minutes to 1 hour.

11. The process of claim 10, wherein said aqueous solution contains about 48 percent by weight of hydrogen bromide.

12. A process for producing a compound of the formula:

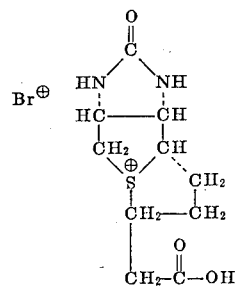

or a racemate thereof, comprising refluxing a compound of the formula:

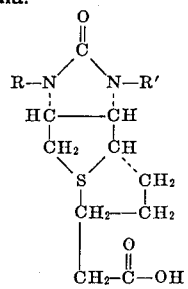

wherein R and R' are phenyl lower alkyl, lower alkyl phenyl lower alkyl, or lower alkoxy phenyl lower alkyl;
or a racemate thereof, with an aqueous solution containing from about 20 percent by weight to about 48 percent by weight of hydrogen bromide for a period of at least 1 hour.

13. A process for producing a compound of the formula:

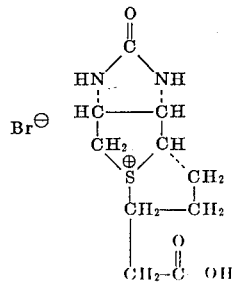

or a racemate thereof, comprising refluxing a compound of the formula:

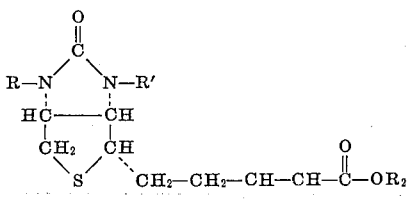

wherein R and R' are phenyl lower alkyl, lower alkyl phenyl lower alkyl or lower alkoxy phenyl lower alkyl and $R_3$ is lower alkyl, phenyl lower alkyl, lower alkyl phenyl lower alkyl or lower alkoxy phenyl lower alkyl;
or a racemate thereof, with an aqueous solution containing from about 20 percent by weight to about 48 percent by weight of hydrogen bromide for a period of at least 2.5 hours.

14. The process of claim 13, wherein said aqueous solution contains about 48 percent by weight of hydrogen bromide.

15. The process of producing an ester of the formula:

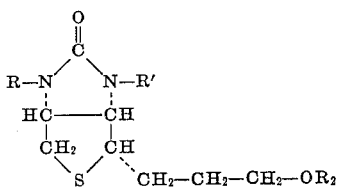

wherein R and R' are phenyl lower alkyl, lower alkyl phenyl lower alkyl or lower alkoxy phenyl lower alkyl and $R_2$ is lower alkanoyl, phenyl lower alkanoyl, lower alkyl phenyl lower alkanoyl or lower alkoxy phenyl lower alkanoyl;
or a racemate thereof, comprising reacting a compound of the formula:

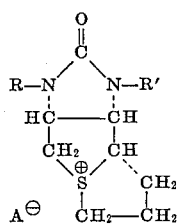

wherein A is a halide or a sulfonate and R and R' are as above;
or a racemate thereof, with a salt selected from the group consisting of alkali metal salts of lower alkanoic acids and alkali metal salts of phenyl, lower alkyl phenyl or lower alkoxy phenyl lower alkanoic acids.

16. The process of claim 15 wherein said reaction is carried out in a reaction medium composed of a lower alkanol and water.

17. The process of claim 15 wherein A is selected from the group of anions consisting of halogen ions and sulfonates.

18. The process of claim 17 wherein A is selected from the group consisting of chloride, bromide and camphorsulfonate.

19. A compound of the formula:

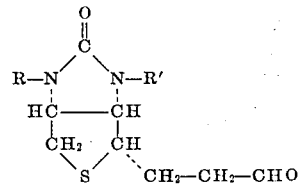

wherein R and R' are phenyl lower alkyl, lower alkyl phenyl lower alkyl or lower alkoxy phenyl lower alkyl;
or a racemate thereof.

20. The compound of claim 19, wherein said compound is d,1-1,3-dibenzyl-2-oxohexahydrothieno[3,4-d]imidazole-4β-propionaldehyde.

21. A process for producing an aldehyde of the formula:

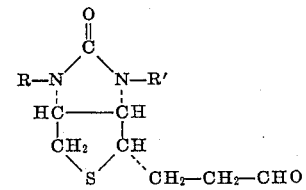

wherein R and R' are phenyl lower alkyl, lower alkyl phenyl lower alkyl or lower alkoxy phenyl lower alkyl;
or a racemate thereof, comprising oxidizing a compound of the formula:

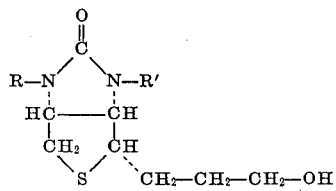

wherein R and R' are as above;
or a racemate thereof, with an oxidizing agent in the presence of strong dehydrating agent and an acid catalyst selected from the group consisting of pyridine trihaloacetate and phosphoric acids at a temperature of from −40° C. to 70° C. to produce said aldehyde.

22. The process of claim 21, wherein said dehydrating agent is selected from the group consisting of diloweralkyl and dicycloalkylcarbodiimide and said oxidizing agent is a dilower alkyl sulfoxide.

24. The process of claim 22, wherein said dehydrating agent is dicyclohexylcarbodiimide and said sulfoxide is dimethyl sulfoxide.

24. A process of producing a compound of the formula:

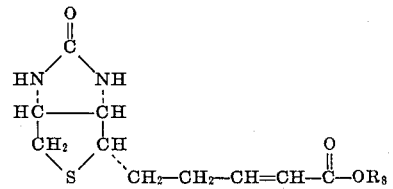

wherein $R_8$ is lower alkyl, phenyl lower alkyl, lower alkyl phenyl lower alkyl or lower alkoxy phenyl lower alkyl;
or a racemate thereof, comprising treating a compound of the formula:

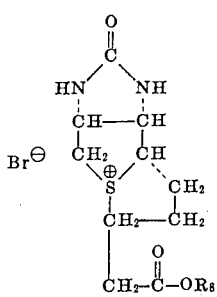

wherein $R_8$ is as above;
or a racemate thereof, with a weak base at a temperature of from 0° to 40° C.

25. The process of claim 24, wherein said weak base is selected from the group consisting of alkali metal carbonates, alkali metal bicarbonates, alkali metal phosphates, and organic amine bases.

26. The process of producing an unsaturated compound of the formula:

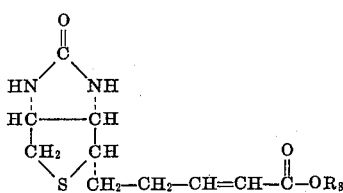

wherein $R_8$ is a lower alkyl, phenyl lower alkyl, lower alkyl phenyl lower alkyl or lower alkoxy phenyl lower alkyl; or a racemate thereof, comprising:

a. esterifying an acid of the formula:

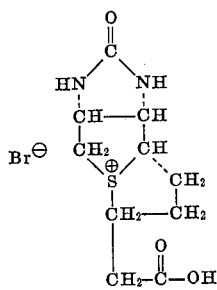

or a racemate thereof, with an esterifying agent selected from the group consisting of lower alkanols and aryl lower alkanols to produce an ester, and b. treating said ester with a weak base at a temperature of from 0° to 40° C. to produce said unsaturated compound.

27. The process of claim 26, wherein said weak base is selected from the group consisting of alkali metal carbonates, alkali metal bicarbonates, alkali metal phosphates, and organic amine bases.

28. The process of claim 26, wherein said weak base is sodium bicarbonate.

29. A process for producing an ester of the formula:

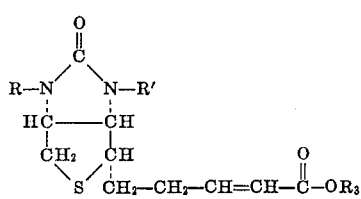

wherein R and R' are phenyl lower alkyl, lower alkyl phenyl lower alkyl or lower alkoxy phenyl lower alkyl and $R_3$ is lower alkyl, phenyl lower alkyl, lower alkyl phenyl lower alkyl or lower alkoxy phenyl lower alkyl;
or a racemate thereof, comprising reacting a compound of the formula:

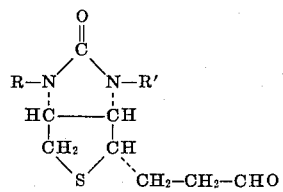

wherein R and R' are as above;
or a racemate thereof, with a compound of the formula:

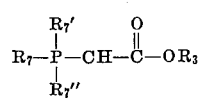

wherein $R_3$ is as above and $R_7$, $R_7'$ and $R_7''$ are lower alkyl phenyl, lower alkyl phenyl, lower alkoxy phenyl, phenyl lower alkyl, lower alkyl phenyl lower alkyl or lower alkoxy phenyl lower alkyl;
in an inert organic solvent medium to form said ester.

30. The process of claim 29, wherein said reaction is carried out at a temperature of from 10° C. to 40° C.

31. A process for producing an aldehyde of the formula:

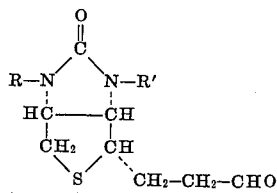

wherein R and R' are phenyl lower alkyl, lower alkyl phenyl lower alkyl or lower alkoxy phenyl lower alkyl;
or a racemate thereof, comprising treating a compound of the formula:

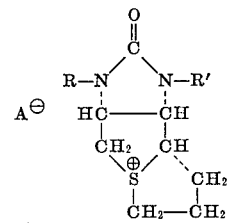

wherein R and R' are as above and A is a halide or a sulfonate;
or a racemate thereof, with an alkali metal salt of a secondary nitro lower alkane containing from three to seven carbon atoms.

32. The process of claim 31, wherein said salt is the alkali metal salt of 2-nitro propane.

33. The process of claim 31 wherein A is selected from the group of anions consisting of halogen anions and sulfonates.

34. The process of claim 33 wherein A is selected from the group consisting of chloride, bromide and camphorsulfonate.

* * * * *